(12) United States Patent
Yao

(10) Patent No.: US 8,038,022 B2
(45) Date of Patent: Oct. 18, 2011

(54) HIGHWAY VEHICLE TOWING SYSTEM

(76) Inventor: Yi-Shan Yao, Taichung (TW)

( * ) Notice: Subject to any disclaimer, the term of this patent is extended or adjusted under 35 U.S.C. 154(b) by 57 days.

(21) Appl. No.: 12/588,061

(22) Filed: Oct. 2, 2009

(65) Prior Publication Data

US 2011/0079167 A1    Apr. 7, 2011

(51) Int. Cl.
*B61G 5/00* (2006.01)
(52) U.S. Cl. .............. 213/75 R; 191/33 R; 105/72.2
(58) Field of Classification Search ............. 105/26.05, 105/26.1, 34.1, 72.2, 215.1, 215.2; 191/33, 191/34, 35, 50; 104/139, 140; 213/75 R, 213/77, 78, 79, 208
See application file for complete search history.

(56) References Cited

U.S. PATENT DOCUMENTS

| | | | | | |
|---|---|---|---|---|---|
| 427,333 | A | * | 5/1890 | Lewis | 191/58 |
| 456,514 | A | * | 7/1891 | Hunter | 191/33 R |
| 499,112 | A | * | 6/1893 | Henry | 191/33 R |
| 559,175 | A | * | 4/1896 | Hunter | 191/33 R |
| 633,294 | A | * | 9/1899 | Perew | 105/29.1 |
| 887,691 | A | * | 5/1908 | Potter | 191/50 |
| 942,450 | A | * | 12/1909 | Larson | 440/34 |
| 1,845,763 | A | * | 2/1932 | Phillips | 369/179 |
| 1,871,074 | A | * | 8/1932 | Montrose-Oster | 105/118 |
| 2,508,091 | A | * | 5/1950 | Benbow | 191/23 A |
| 2,812,617 | A | * | 11/1957 | Longarzo | 446/439 |
| 3,152,704 | A | * | 10/1964 | Russell | 414/563 |
| 3,877,591 | A | * | 4/1975 | Howard | 414/563 |
| 3,977,532 | A | * | 8/1976 | Hackman | 213/208 |
| 3,990,719 | A | * | 11/1976 | Wright | 280/408 |
| 4,375,343 | A | * | 3/1983 | Butler | 414/508 |
| 4,685,399 | A | * | 8/1987 | Baker | 105/4.1 |
| 5,105,955 | A | * | 4/1992 | Hawryszkow et al. | 213/75 R |
| 5,134,940 | A | * | 8/1992 | Fujita et al. | 104/139 |
| 5,138,952 | A | * | 8/1992 | Low | 105/72.2 |
| 5,740,742 | A | * | 4/1998 | Bush | 105/72.2 |
| 5,775,524 | A | * | 7/1998 | Dunham | 213/75 TC |
| 6,324,993 | B1 | * | 12/2001 | Jacob | 105/72.2 |
| 6,691,883 | B1 | * | 2/2004 | Daugherty, Jr. | 213/75 R |
| 7,159,888 | B1 | * | 1/2007 | Sutton et al. | 280/411.1 |
| 7,802,689 | B2 | * | 9/2010 | Kanjo | 213/61 |
| 2007/0084817 | A1 | * | 4/2007 | Voong et al. | 213/75 R |
| 2007/0089635 | A1 | * | 4/2007 | Blanco Montejo | 104/139 |
| 2007/0125739 | A1 | * | 6/2007 | Hogbring et al. | 213/75 R |
| 2007/0175851 | A1 | * | 8/2007 | Hogbring | 213/62 R |
| 2009/0194000 | A1 | * | 8/2009 | Jacob | 105/72.2 |
| 2011/0079167 | A1 | * | 4/2011 | Yao | 105/1.4 |

* cited by examiner

*Primary Examiner* — Joe Morano, IV
*Assistant Examiner* — Jason C Smith
(74) *Attorney, Agent, or Firm* — Rosenberg, Klein & Lee

(57) ABSTRACT

A highway vehicle towing system includes a light railroad track embedded in a highway and capable of transmitting electricity from a power supply plant, and a towing tractor movable along the light railroad track to tow a car. The owing tractor has multiple pairs of metal wheels movably supported on the light railroad track, a motor, electrical wires connecting the metal wheels to the motor for transmitting electricity from the light railroad track to the motor, a transmission shaft coupled to and rotatable by the motor, and a differential mechanism coupled between the transmission shaft and the metal wheels for enabling the metal wheels to be rotated along the light railroad track by the motor.

8 Claims, 6 Drawing Sheets

HIGHWAY VEHICLE TOWING SYSTEM

BACKGROUND OF THE INVENTION

1. Field of the Invention

The present invention relates to a highway vehicle towing system, which uses a towing tractor to move on a highway along a light railroad track, thereby towing a car. The towing tractor obtains power supply from a power plant through the light railroad track for charging the battery of the car being towed.

2. Description of the Related Art

Following fast development of industry, discharged gas from vehicles and factories cause severe air pollution, threatening our health, our environment and our quality of life. Many vehicle manufacturers keep designing hybrid cars, electric cars and other cars that consume less fuel gas. A hybrid car combines a conventional internal combustion engine propulsion system with an electric propulsion system. The most common form of hybrid car is a car driven by a gasoline internal combustion engine and electric motors powered by batteries. A hybrid car reduces fuel gas consumption. However, the gasoline internal combustion engine of a hybrid car still discharges waste gas during operation. For a long distance travel, a hybrid car will still consume a big amount of fuel gas.

Further, many electric cars are known using batteries to power motors. An electric car can travel for a distance about 160~180 kms when the batteries are fully charged once. This range cannot satisfy the demand. In consequence, an electric car is not suitable for a long distance traveling. When driving a hybrid car or electric car down a highway or freeway, the driver may have to charge the batteries of the car before reaching the destination.

SUMMARY OF THE INVENTION

The present invention has been accomplished under the circumstances in view. It is one object of the present invention to provide a highway vehicle towing system, which is practical for towing hybrid or electric cars in a highway economically and safely.

To achieve this and other objects of the present invention, a highway vehicle towing system is used in a highway for towing hybrid or electric cars. The highway vehicle towing system comprises a light railroad track embedded in a highway and capable of transmitting electricity from a power supply plant, and at least one towing tractor movable along the light railroad track to tow a hybrid or electric car. Each towing tractor comprises multiple pairs of metal wheels movably supported on the light railroad track, a motor, electrical wires connecting the metal wheels to the motor for transmitting electricity from the light railroad track to the motor, a transmission shaft coupled to and rotatable by the motor, and a differential mechanism coupled between the transmission shaft and the metal wheels for enabling the metal wheels to be rotated along the light railroad track by the motor.

Further, each towing tractor comprises a coupling located on the rear side thereof and connectable to a connection member at the front side of each car to be towed. Further, each towing tractor further comprises a female electric connector mounted on the coupling thereof; each hybrid or electric car to be towed comprises a male electric connector mounted on the connection member thereof and electrically connectable to the female electric connector of the towing tractor upon connection between the coupling of the respective towing tractor and the connection member of the respective hybrid or electric car for allowing transmission of electricity from the respective towing tractor to the hybrid or electric car to charge the batteries of the hybrid or electric car.

Because the highway vehicle towing system obtains the necessary working voltage from a power plant through the light railroad track, the invention saves much fuel gas cost and reduces air pollution.

DETAILED DESCRIPTION OF THE PREFERRED EMBODIMENT

Figure 1:
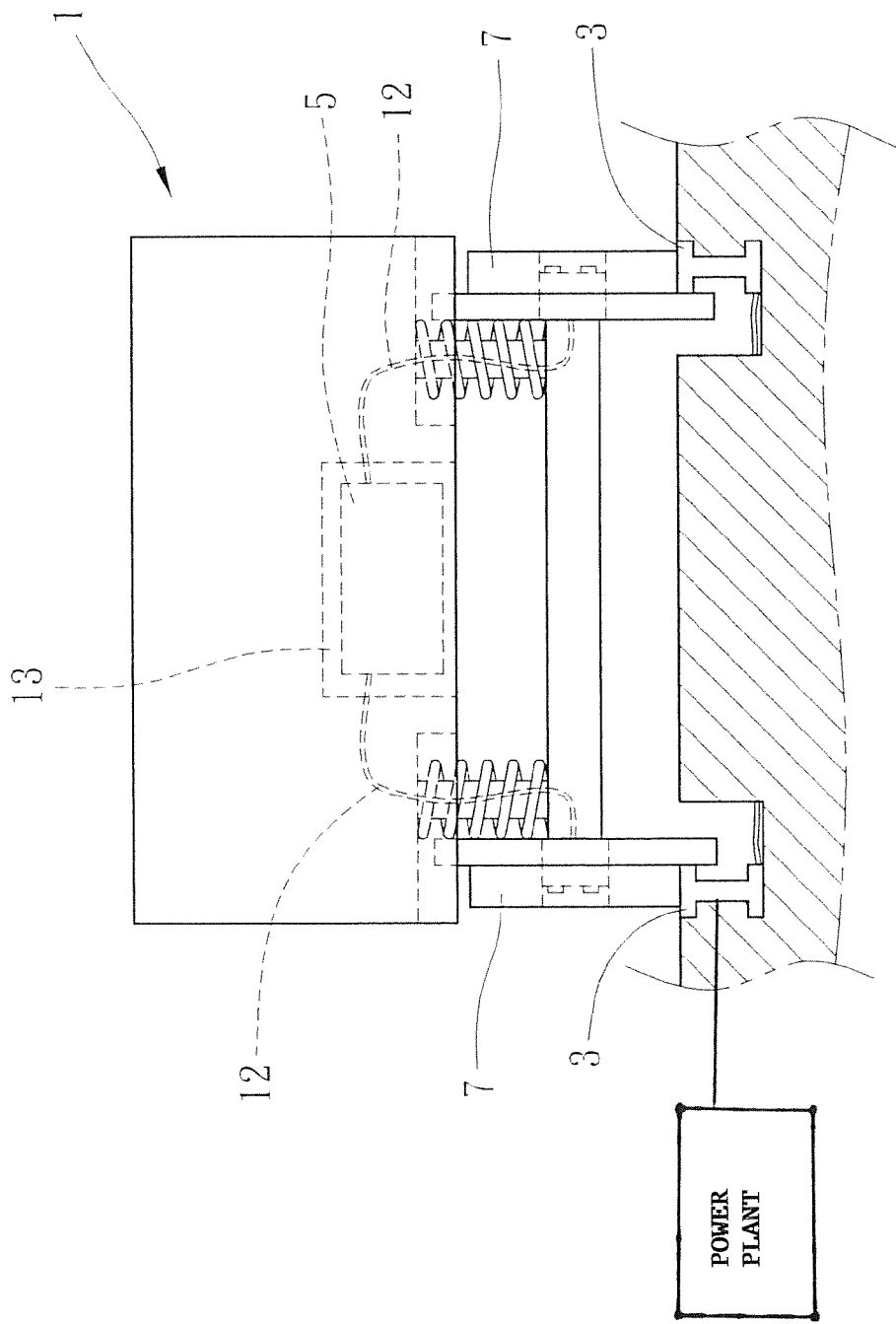
FIG. 1 is a schematic sectional view of a part of a highway vehicle towing system in accordance with the present invention, showing a towing tractor supported on a light railroad track.
Figure 2:
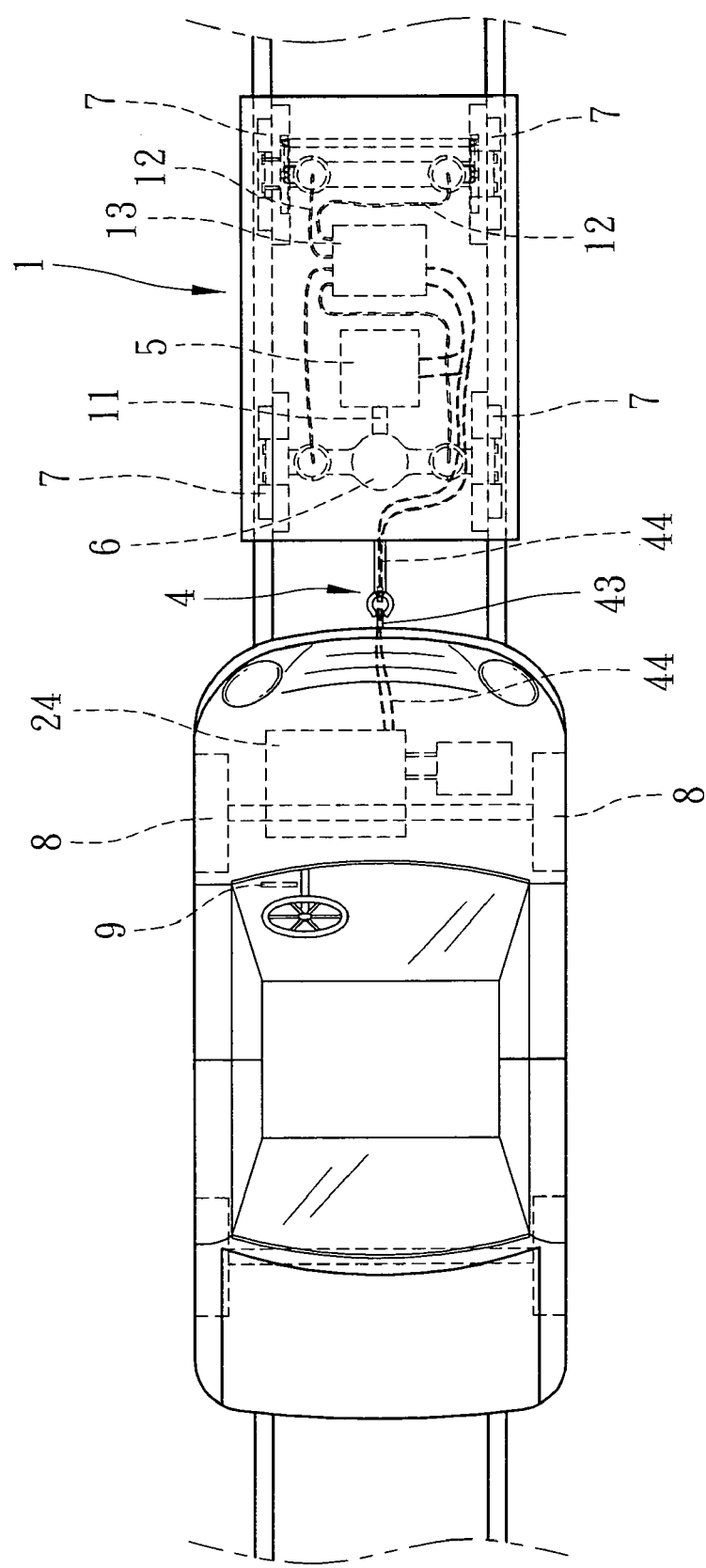
FIG. 2 is a schematic top view of the present invention, showing a car coupled to one towing tractor on the light railroad track.
Figure 3:
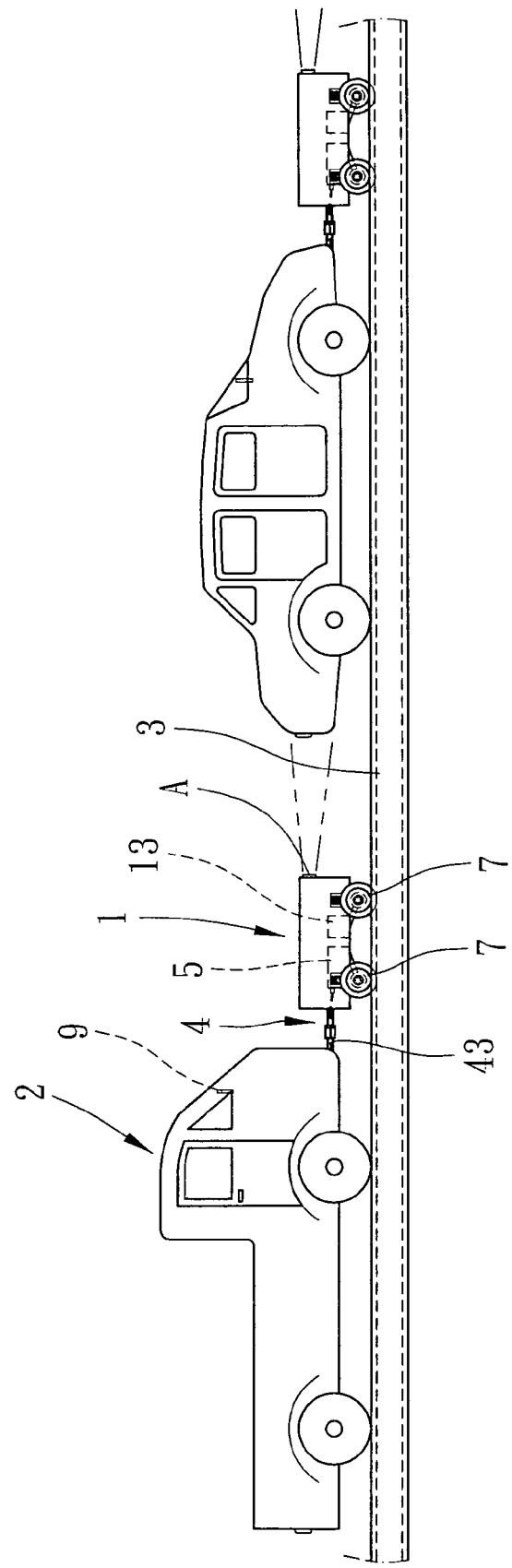
FIG. 3 is a schematic side view of the present invention, showing an operation status of the radar range finder on one towing tractor on the light railroad track.
Figure 4A:
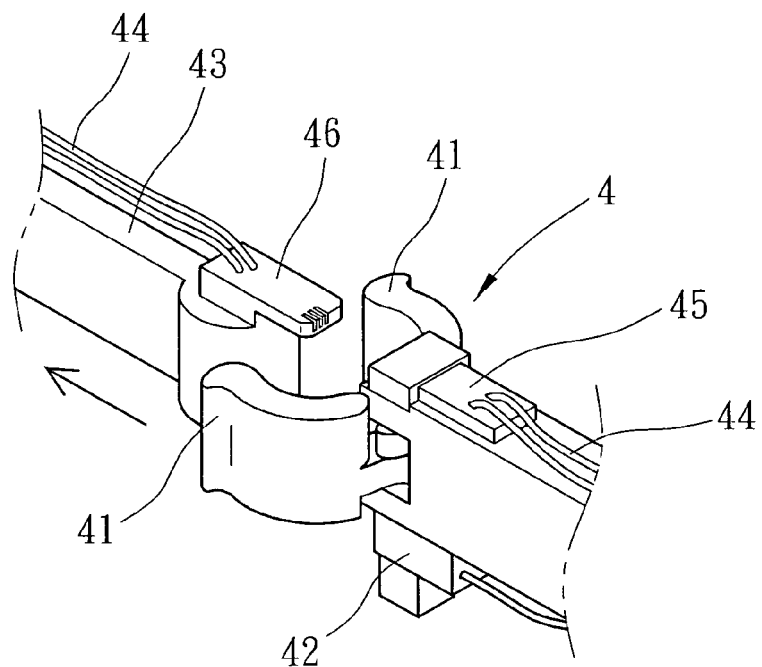
FIG. 4A is a schematic drawing of a part of the present invention, showing the relationship between the coupling at the rear side of a towing tractor and the connection member at the front side of a car.
Figure 5A:
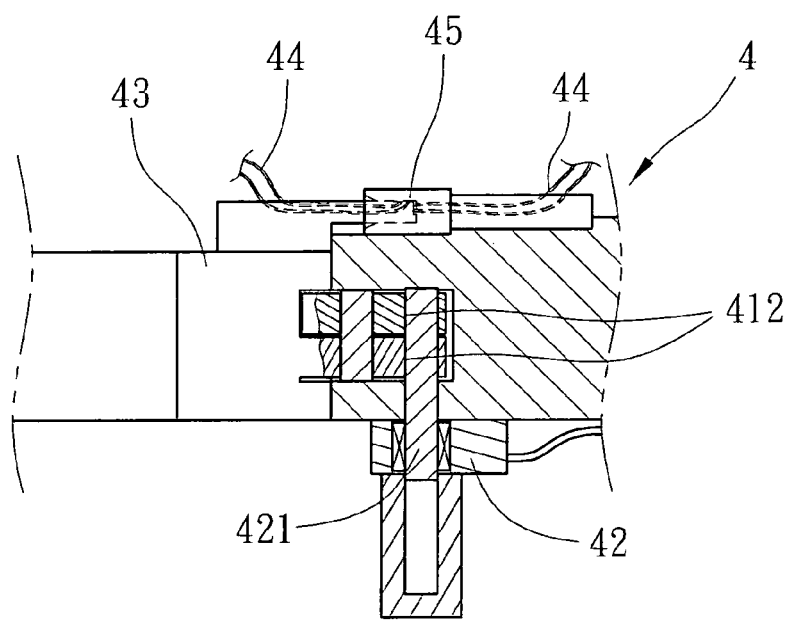
FIG. 5A is a schematic sectional side view, showing the coupling at the rear side of the towing tractor and the connection member at the front side of the car connected together.
Figure 4B:
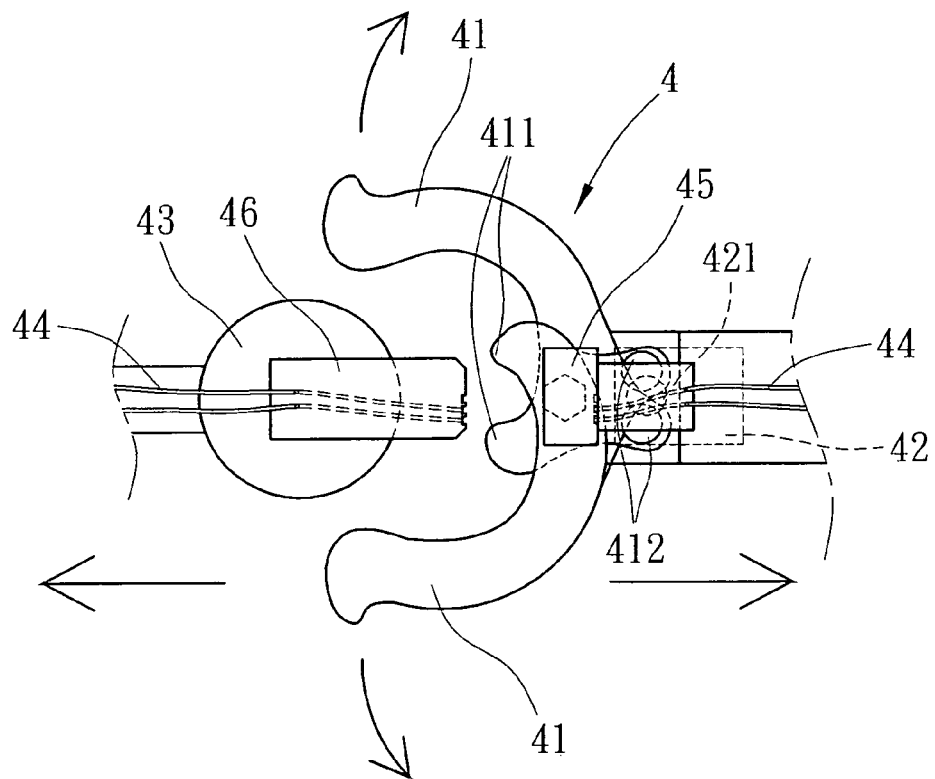
FIG. 4B is a schematic top view of FIG. 4A.
Figure 5B:
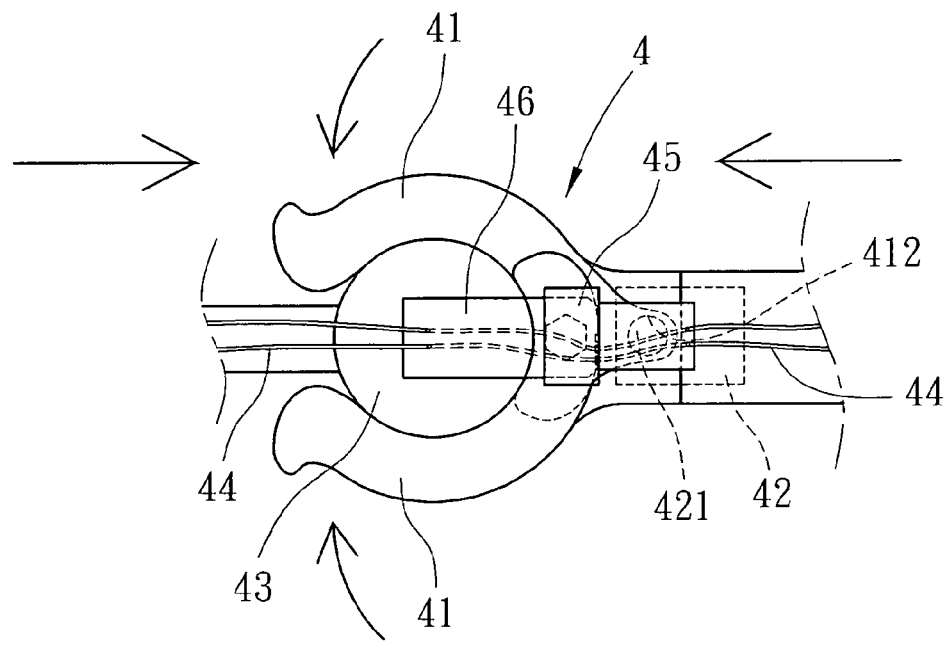
FIG. 5B is a schematic drawing showing an operating status of the highway vehicle towing system.
Figure 6:
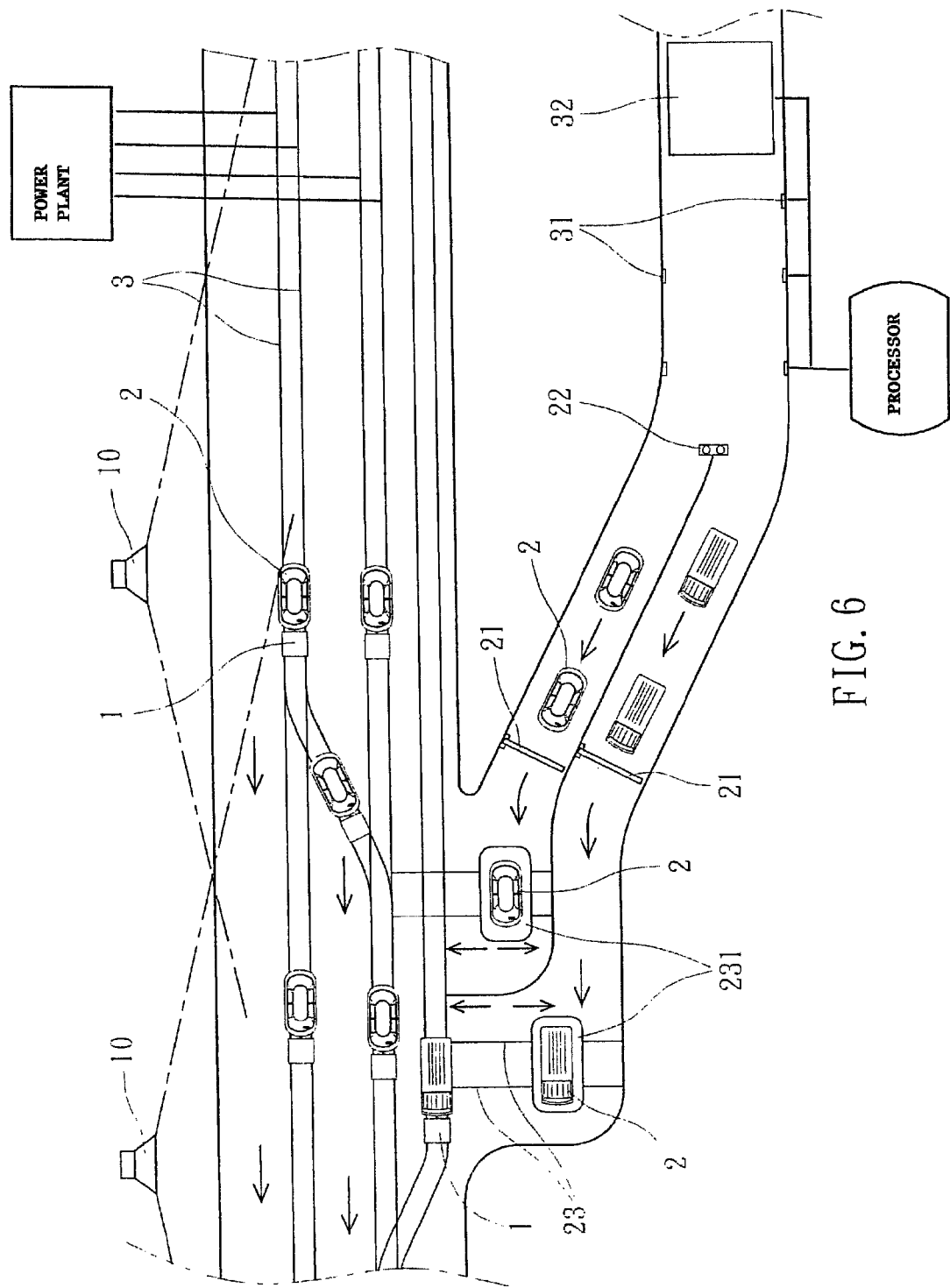
FIG. 6 is a schematic drawing of the present invention showing an application example of the highway vehicle towing system.

Referring to FIGS. 1~6, a highway vehicle towing system in accordance with the present invention is shown comprising a light railroad track 3 embedded in a highway, and towing tractors 1 movable along the light railroad track 3 for towing hybrid or electric cars 2.

The towing tractor 1 comprises two pairs of metal wheels 7 movably supported on the light railroad track 3. The width of the light railroad track 3 is shorter than the pitch of each pair of wheels 8 of each hybrid or electric car 2. When the towing tractor 1 moves along the light railroad track 3 on the highway to tow one hybrid or electric car 2, the wheels 8 of the hybrid or electric car 2 are running on the railway at two opposite sides relative to the light railroad track 3.

The towing tractor 1 comprises a motor 5, electrical wires 12 connecting the metal wheels 7 to the motor 5 for transmitting electricity from a power plant (not shown) through the light railroad track 3 to the motor 5, a transmission shaft 11 coupled to and rotatable by the motor 5, and a differential mechanism 6 coupled between the transmission shaft 11 and the metal wheels 7 for enabling the metal wheels 7 to be rotated by the motor 5.

Before driving a hybrid or electric car 2 down the highway, the driver must carry a value-added card B so that the driver can use the value-added card B to pay for the toll when getting off the highway. When a hybrid or electric car 2 passed through a gate before entering the highway, the weight of the hybrid or electric car 2 will be measured by a vehicle scale 32, and then the length of the hybrid or electric car 2 will be measured by car-length measuring sensors 31. Subject to the measured car weight and car length data, the hybrid or electric car 2 is determined to be a big car or small car by a computer. Thereafter, the driver drives the hybrid or electric car 2 into one of two lanes subject to the indication of a traffic light 22. The two lanes are respectively controlled by a respective gate 21 for the passing of small cars and big cars respectively. After a hybrid or electric car 2 passed through the gate 21 on one of the two lanes, the hybrid or electric car 2 enters a carriage 231 on one respective transverse track 23. The carriage 231 is controllable to carry the loaded hybrid or electric car 2 to the light railroad track 3 in the highway for towing by the towing tractor 1. At this time, a serviceman insert a mileage card C into the towing tractor 1 for counting the toll of this transportation.

The towing tractor 1 further comprises a radar range finder A located on the front side thereof for measuring the distance of a front car and giving an audio warning signal when the front car is within a dangerous distance.

The towing tractor 1 further comprises a coupling 4 located on the rear side thereof for connection to a connection member 43 at the front side of a hybrid or electric car 2, and a power transformer unit 13. The connection member 43 holds a male electric connector 46. The coupling 4 comprises two clamping arms 41 each having an actuating portion 411, an electromagnetic valve 42, and female electric connector 45. Further, electrical wires 44 are installed to connect the female electric connector 45 to the power transformer unit 13 of the towing tractor 1 and the male electric connector 46 to the power supply unit 24 of the hybrid or electric car 2 being towed. When approaching the towing tractor 1 to a failed hybrid or electric car 2 to be towed, the connection member 43 of the hybrid or electric car 2 will be stopped against the actuating portions 411 of the clamping arms 41, causing the clamping arms 41 to be clamped on the connection member 43. At this time, the male electric connector 46 is electrically connected to the female electric connector 45 for enabling the power transformer unit 13 of the towing tractor 1 to charge the power supply unit 24 of the hybrid or electric car 2 electrically, and the electromagnetic valve 42 is disenergized to release spring-supported reciprocating rods 421, for enabling the spring-supported reciprocating rods 421 to engage into a respective pin hole 412 and to further lock the clamping arms 41 in the clamped position. When the electromagnetic valve 42 is energized to attract the spring-supported reciprocating rods 421, the spring-supported reciprocating rods 421 are disengage from the respective pin holes 412, thereby unlocking the clamping arms 41 from the connection member 43.

Further, radar detectors 10 are installed in selected locations alone the highway to detect traffic conditions. In case of a traffic accident, the nearby radar detector 10 gives a radio warning signal to the display screen 9 of every nearby hybrid or electric car 2 running on the highway, informing the driver to drive the hybrid or electric car 2 off the highway through an interchange, avoiding traffic jam.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A highway vehicle towing system used in a highway for towing vehicles, comprising:
   a vehicle to be towed;
   a light railroad track embedded in a highway and capable of transmitting electricity from a power supply plant, said light railroad track having a width shorter than the pitch of each pair of wheels of the vehicle to be towed in said highway; and
   at least one towing tractor substantially aligned with said vehicle being towed and movable along said light railroad track to tow the vehicle, each said towing tractor comprising multiple pairs of metal wheels having a pitch substantially equal to said width of said railroad track for contact therewith and movably supported on said light railroad track, a motor located within said towing tractor, electrical wires connecting said metal wheels to said motor for transmitting electricity from said light railroad track to said motor and further coupled to a power supply unit within said towed vehicle and are connected to a power supply unit within said towed vehicle for charging a battery within the towed vehicle, a transmission shaft coupled to and rotatable by said motor, and a differential mechanism coupled between said transmission shaft and said metal wheels for enabling said metal wheels to be rotated along said light railroad track by said motor.

2. The highway vehicle towing system as claimed in claim 1, wherein each said towing tractor comprises a coupling located on a rear side thereof and connectable to a connection member at the front side of each vehicle to be towed.

3. The highway vehicle towing system as claimed in claim 2, wherein the coupling at each said towing tractor comprises two clamping arms for clamping on the connection member of one of the vehicles to be towed, each said clamping arm having an actuation portion movable by the connection member of one of the cars to be towed, and an electromagnetic valve for controlling movement of a reciprocating rod between a locking position to lock said clamping arms to the connection member clamped by said clamping arms and an unlocking position to unlock said clamping arms from the connection member.

4. The highway vehicle towing system as claimed in claim 3, wherein each said towing tractor further comprises a female electric connector mounted on the coupling thereof; each vehicle to be towed comprises a male electric connector mounted on the connection member thereof and electrically connectable to the female electric connector of one said towing tractor upon connection between the coupling of the respective towing tractor and the connection member of the respective vehicle for allowing transmission of electricity from the respective towing tractor to the respective vehicle.

5. The highway vehicle towing system as claimed in claim 1, wherein when one vehicle is connected to one said towing tractor on said light railroad track, the vehicle is started to move the linked towing tractor forwards along said light railroad track at an initial stage for a predetermined period of time, and then an engine of the vehicle is turned off for enabling the linked towing track to tow the vehicle.

6. The highway vehicle towing system as claimed in claim 1, wherein each vehicle is measured through a vehicle scale and car-length measuring sensors coupled to a computer for selectively sizing said vehicle into a predetermined size group for directing the towed vehicle into a preselected lane of a highway.

7. The highway vehicle towing system as claimed in claim 1, wherein each said towing tractor comprises a radar range finder located on a front side thereof for measuring the distance of a vehicle located frontally of the towing tractor and controlling stoppage of the metal wheels thereof when the frontal vehicle is detected to be within a predetermined distance of said towing tractor.

8. The highway vehicle towing system as claimed in claim 1, further comprising a plurality of radar detectors installed in selected locations along said highway to detect traffic conditions constituting traffic congestion in said highway and to send a wireless warning signal upon occurrence of a traffic accident in said highway, and a display screen installed in each vehicle to be towed for receiving and displaying a wireless warning signal from said radar detectors.

* * * * *